April 26, 1949.  S. MARCUS ET AL  2,468,565
STILL PICTURE PROJECTOR
Filed Feb. 19, 1946  4 Sheets-Sheet 1

INVENTORS
SAMUEL MARCUS
EVAN J. ANTON
BY
ATTORNEY

April 26, 1949.    S. MARCUS ET AL    2,468,565
STILL PICTURE PROJECTOR
Filed Feb. 19, 1946    4 Sheets-Sheet 2
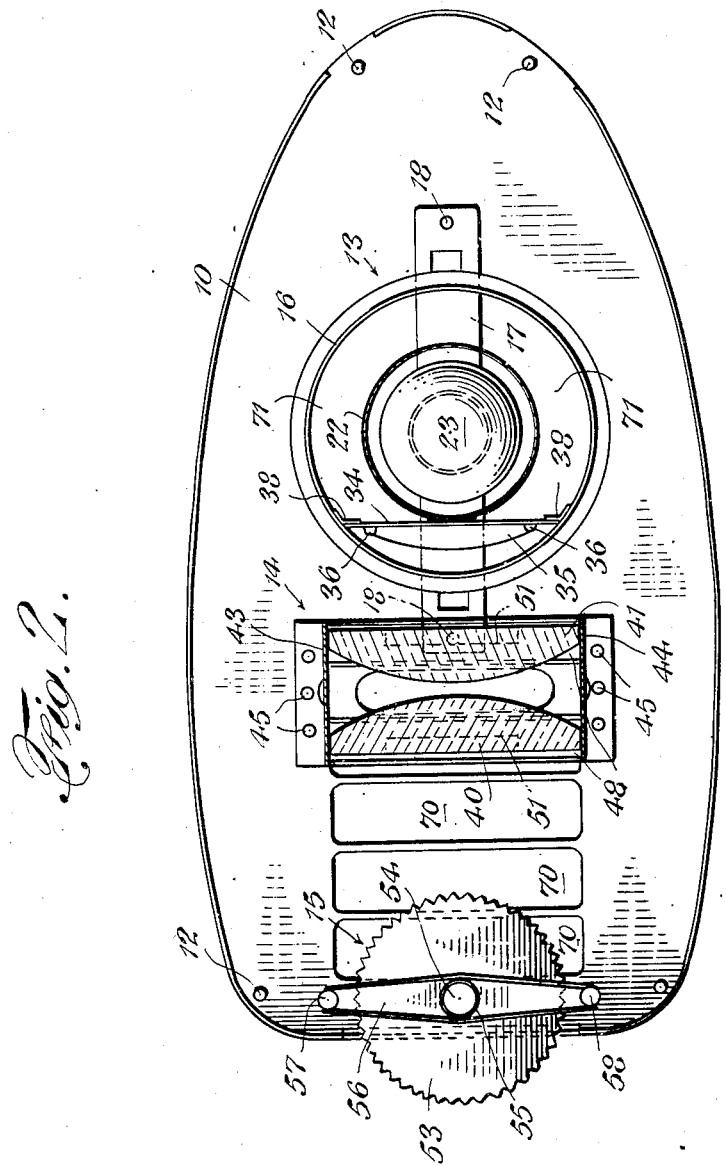
INVENTORS
SAMUEL MARCUS
EVAN J. ANTON
BY
ATTORNEY

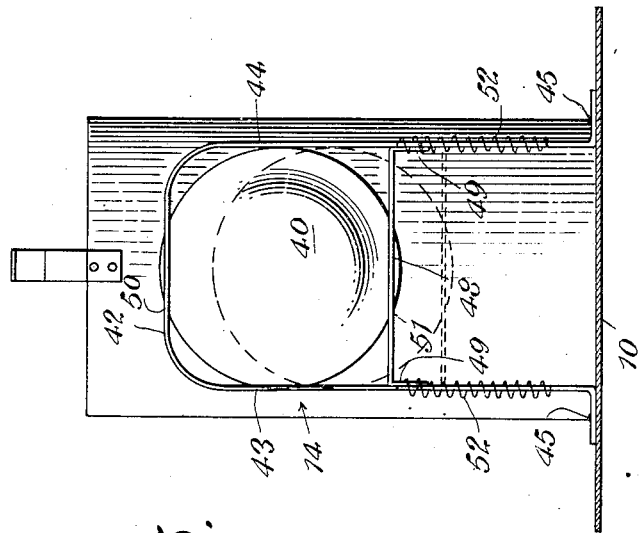
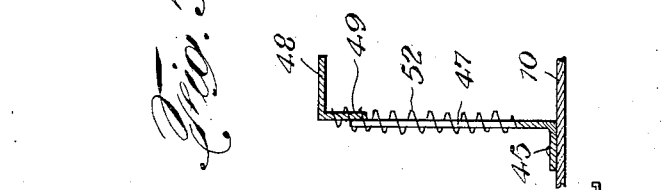
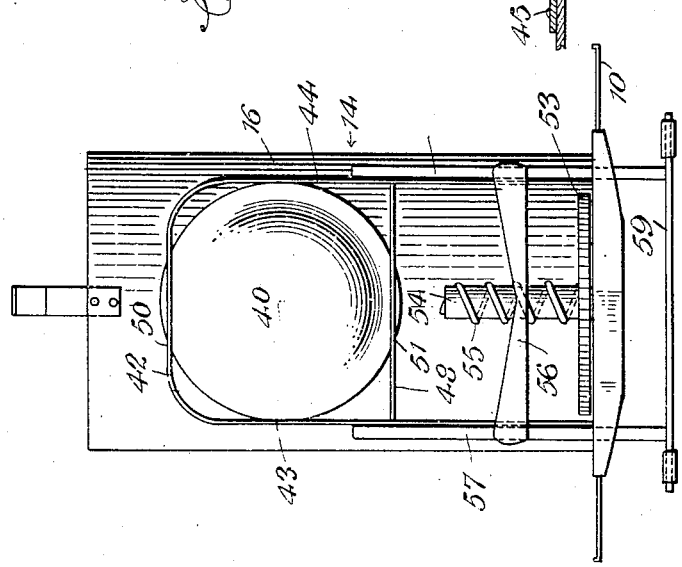

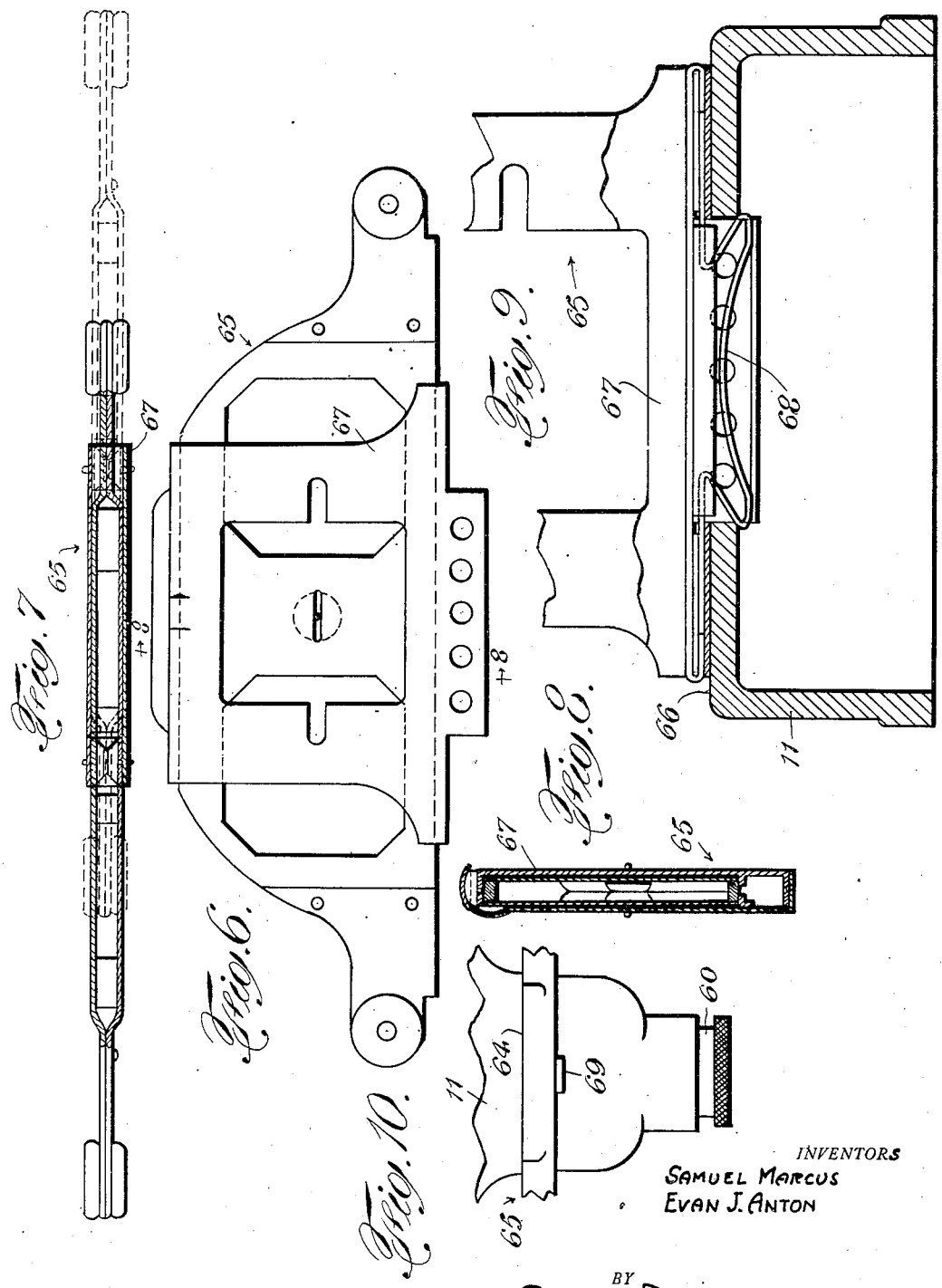

Patented Apr. 26, 1949

2,468,565

UNITED STATES PATENT OFFICE 2,468,565

STILL PICTURE PROJECTOR

Samuel Marcus, New York, and Evan J. Anton, Sunnyside, N. Y.

Application February 19, 1946, Serial No. 648,697

1 Claim. (Cl. 88—26)

The present invention relates to a projector and more particularly to a home projector adapted to project "stills."

The object of the present invention is to provide a projector, which is inexpensive to manufacture, simple and durable in structure, and may be assembled and dismantled with great ease and celerity.

Another object of the present invention is to provide a projector wherein substantially all the major apparatus is removably fixed to a base plate.

Another object of the present invention is to provide a projector with sufficient ventilation therein to keep it cool at all times.

Other objects and advantages of the present invention will be brought out in the following specification.

Reference will be had to the accompanying drawings, forming a part of the specification in which similar reference characters indicate corresponding parts throughout the several views, in which, Fig. 1 is a longitudinal section of the projector;

Fig. 2 is a top plan view partly in section, of the base plate;

Figs. 3, 4 and 5 are detailed views of the elevator mechanism, and the supporting structure for the condensers;

Fig. 6 is a front view of the slide carrier in a neutral position;

Fig. 7 is a plan view of the slide carrier partly in section;

Fig. 8 is a cross section in the line 8—8 of Fig. 6;

Fig. 9 is an enlarged detail view of the slide carrier housing, showing how it is attached to the projector; and Fig. 10 is a fragmentary detail showing the slide carrier mounted in the projector.

Figure 1:
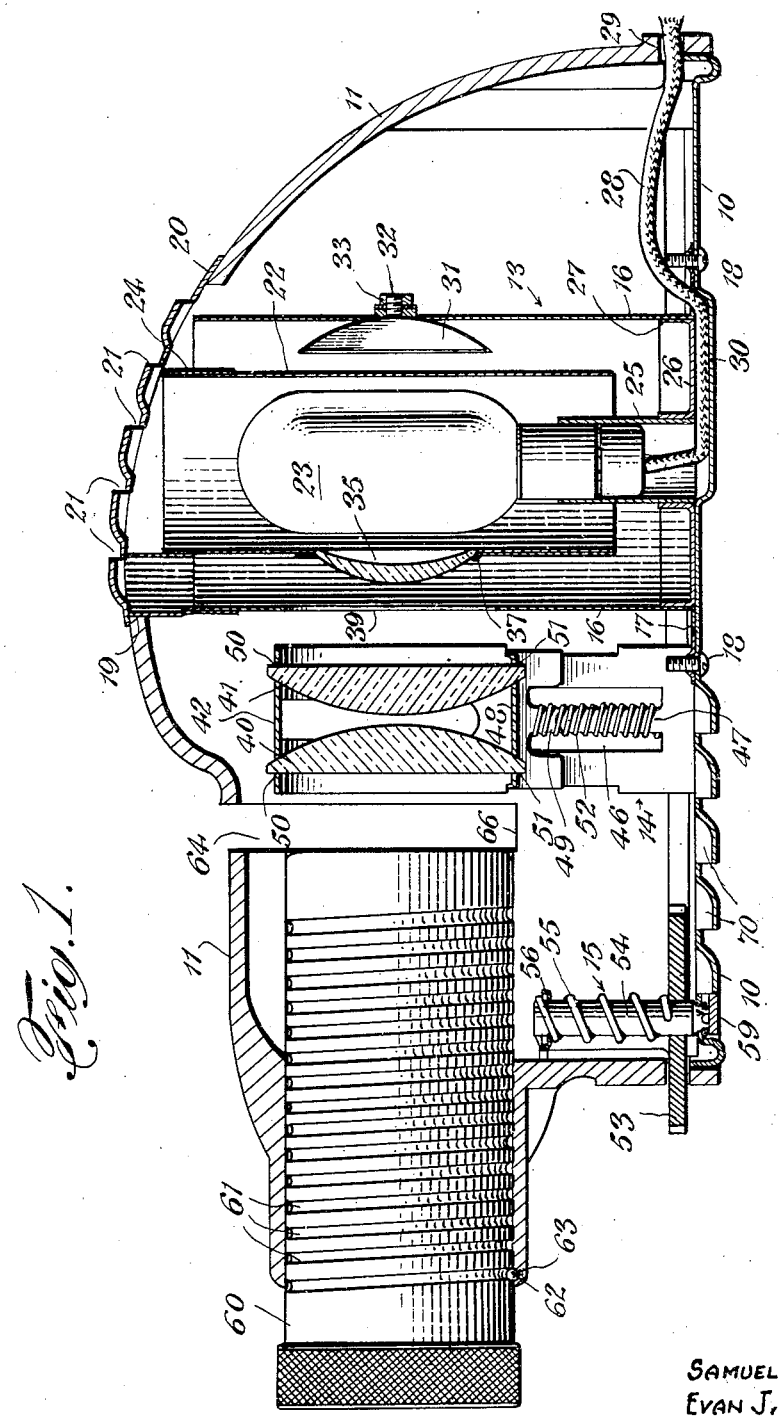

Referring to the drawings, wherein I have shown by way of illustration merely, a projector comprising a base plate 10, which is fixed to a housing 11, by means of screws 12.

The base plate 10, supports a lamp housing 13, a support 14 for a pair of condensers, and an elevating mechanism 15.

The lamp housing 13, comprises a cylindrical tube 16, which is fixed to the base plate 10 by a bracket 17, which in turn is secured to the base plate 10, by screws 18.

The cylindrical tube 16 extends upwardly into an opening 19, in the housing 11.

A cover plate 20 having louvres 21 therein, completely covers the opening 19 in the housing 11, and has secured thereto and depending therefrom a chimney 22, which surrounds the lamp socket and tube 23.

The chimney 22 is secured to the cover in any suitable manner, such as, by a spot welded flange 24.

The tube or lamp 23 which is preferably a double contact bulb, candelabra type, is held in a socket 25, which is secured to a flange 26, and this flange in turn is secured to the cylindrical tube 16 by an upturned flange 27.

The lamp socket 25 is hollow and adapted to receive a lead-in cord 28, which is threaded through an opening 29 in the rear of the housing 11, and thence, through a channel 30 in the base plate 10, and into the inside of the socket 25 to connect with the tube 23. Supported on the lamp housing cylinder 16 by screws 32 and a nut 32 is an adjustable reflector 31.

The chimney 22 has secured thereto a plate 34 spot welded tangentially thereon which carries, preferably, a meniscus lense 35, which is held in position on the plate 34 by claws 36, punched out of the plate 34 adjacent the edge of the opening 37 on the plate 34.

It will be noticed by referring to Figs. 1 and 2, that when the cover plate 20 supporting the chimney 22 is lowered down through the opening 19 in the housing 11, to cover the tube 23, the plate 34 will slide against a pair of angular brackets 38, secured to the cylinder 16, which serves to properly position the chimney 22 around the tube 23, and also properly position the meniscus lense 35 in respect to the tube 23.

There is an opening 39 in the cylinder 16 to permit the free passage of light from tube 23 therethrough, for projecting through a pair of preferably plano-convex condensers 40 and 41, which are removably mounted in the support 14.

The support 14 comprises a cover 42 integral with a pair of legs 43 and 44, which are secured to the base plate 10 by rivets 45. The legs 43 and 44 have cut-out portions 46 to provide upstanding legs 47.

At the lower part of the condensers 40 and 41 there is a bridge piece 48, riding between the legs 43 and 44.

The bridge piece 48, has both ends turned downwardly to form arms 49, which slide against arms 47 on the legs 43 and 44. Surrounding the arms 47 and 49, are springs 52 which normally hold the peripheral edges of the condensers 40 and 41 into slots 50 in the cover 42, and also into the slots 51 in the bridge piece 48.

This structure firmly holds the condensers 40 and 41 in proper position in respect to the tube 23.

Referring to Fig. 4, it will be seen as indicated in dotted lines, how the condensers are removed from the support 14 by simply lowering the bridge plate 48, which of course removes the peripheral edges of the condenser 40 and 41 from slots 50.

When the condensers 40 and 41 are inserted in the support 14 the bottom peripheral edges are placed in slots 51, as shown in dotted lines, and the springs 52 then urge the bridge plate 48 which carries the condensers upwardly until the upper peripheral edges of the condensers 40 and 41 enter the slots 50 in the cover plate 42.

Referring to Figs. 1 and 3, there is shown an elevating device 15 for raising and lowering the front portion of the projector to properly position the picture on the screen, consisting of a finger wheel 53, which is serrated around the peripheral edge and fixedly secured to an upstanding stub shaft 54, which in turn carries a steep pitched helical screw 55, fixedly secured to the stub shaft 54 and rotating within a cross bar 56.

The cross bar 56 is rigidly secured to a pair of arms 57 and 58, which are guided through the base plate 10, and have a bridge base plate 59 attached to the ends thereof adapted to rest upon a table not shown.

When the finger wheel 53 is rotated it rotates the screw 55 and causes the cross piece 56 to ride up and down upon the screw 55 to raise and lower the front of the projector.

The stub shaft 54 is rotatably mounted in the base plate 10. The housing 11 carries the conventional focusing barrel 60, carrying the customary pair of objective lenses therein for properly focusing the picture on the screen.

The focusing barrel 60 has a spiral channel 61 therein, engaging with a ball detent 62 for adjusting the barrel inwardly and outwardly. The ball 62 has the usual spring 63 to urge the ball in the spiral channel 61.

The housing 11 has a cross cut slot 64 therein, between the focusing barrel 60 and the condenser 40, for the reception of a slide carrier 65.

The slide carrier 65 rests on the bottom of slot 64, as shown at 66 in Figs. 1 and 9.

The slide carrier has a ventilator housing 67 which is fixed to the projector by a spring 68 at the bottom thereof, and a lug 69 at the top thereof.

The details and operation of the slide carrier 65, are brought out in our application Ser. No. 648,698 filed Feb. 19, 1946 concurrently with the present application, and therefore not fully described here.

It will be seen by referring to Figs. 1 and 2, that the cool currents of air will pass through the louvres 70 in the bottom of the base plate 10 and thence upwardly through the opening 39 in the cylinder 16, and out through the louvres 21 in the cover 20, to remove the currents of hot air caused by the tube 23.

The currents of cool air also pass through the openings 71 in the base plate 10 at the bottom of cylinder 16, up through cylinder 16 and out through louvres 21 in the cover 20, which keeps the projector sufficiently cool at all times while in operation.

Many modifications may be made from the present invention without departing from the spirit thereof.

We claim:

A projector for the projection of stills comprising a cover, a base plate, a cylindrical lamp housing having a flange adjacent the bottom thereof, said flange being secured to said base plate, said cylindrical lamp housing having a bottom thereon with a centrally located aperture with an inwardly projecting wall, a tubular lamp socket secured in said centrally located aperture and coaxially aligned with a transverse wire enclosing channel in said base plate, a transverse plate secured inside of said cylindrical lamp house for supporting a cylindrical light shield surrounding said lamp socket, a lens secured to said transverse plate adjacent an aperture therein, an inverted U-shaped condenser stand having the legs thereof secured to said base plate, said stand having a plurality of slots in the top thereof to accommodate tangential portions of a pair of condensers, a movable U-shaped bridge plate having a plurality of slots therein in alignment with said slots in said U-shaped stand to accommodate the tangential portions adjacent the bottom of the condensers, a coil spring surrounding each of said legs on said stand and said bridge plate for facilitating the insertion and removal of said condensers, a focusing barrel in alignment with said condensers having a spiral groove therein for the reception of a ball mounted in said projector cover, a transverse slot in said cover between the condensers and focusing barrel for the reception of a slide carrier, and an elevating device adjacent the front of said projector having a fast spiral screw fixed to a hand wheel inside of said projector cover and projecting therethrough, a transverse plate engaging said fast screw, a transverse foot plate having a vertical arm at each end thereof projecting upwardly thru said base plate and connected to said transverse plate engaging said fast screw.

SAMUEL MARCUS.
EVAN J. ANTON.

REFERENCES CITED

The following references are of record in the file of this patent:

UNITED STATES PATENTS

| Number | Name | Date |
|---|---|---|
| 786,052 | Roebuck | Mar. 28, 1905 |
| 930,210 | Mills | Aug. 3, 1909 |
| 1,699,078 | Readeker | Jan. 15, 1929 |
| 1,902,401 | Gunning | Mar. 21, 1933 |
| 1,919,595 | Owens | July 25, 1933 |
| 2,063,312 | Hopkins | Dec. 8, 1936 |
| 2,089,388 | Lindstrom | Aug. 10, 1937 |
| 2,131,281 | Harbes | Sept. 27, 1938 |
| 2,221,920 | Kurtz et al. | Nov. 19, 1940 |
| 2,292,966 | Osterberg et al. | Aug. 11, 1942 |